United States Patent
Song et al.

(10) Patent No.: US 10,897,151 B2
(45) Date of Patent: Jan. 19, 2021

(54) METHOD AND APPARATUS FOR CHARGE RECYCLING

(71) Applicant: Dialog Semiconductor (UK) Limited, London (GB)

(72) Inventors: Zhenyu Song, Beijing (CN); Junyue Sun, Tianjin (CN); Nailong Wang, Beijing (CN); Ze Han, Beijing (CN); Xiaogang Zhao, Beijing (CN)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/211,861

(22) Filed: Dec. 6, 2018

(65) Prior Publication Data
US 2020/0067338 A1 Feb. 27, 2020

(30) Foreign Application Priority Data
Aug. 24, 2018 (CN) .......................... 2018 1 0971042

(51) Int. Cl.
*H05B 33/00* (2006.01)
*H05B 45/00* (2020.01)
*H02J 7/00* (2006.01)
*H02J 7/34* (2006.01)

(52) U.S. Cl.
CPC ............ *H02J 7/0068* (2013.01); *H05B 45/00* (2020.01); *H02J 7/345* (2013.01)

(58) Field of Classification Search
CPC ....... H02M 1/4241; H02M 2001/0058; H02M 2001/0074; H02M 2001/0077; H02M 3/1584; H02M 3/285; H02M 3/33592; H02M 3/1582; H02M 7/493; H02M 2001/0045; H02M 3/155; H02M 3/156; H02M 3/157; H02M 3/1588; H02M 5/32; H02H 11/002; H02H 3/04; H02H 3/087; H02H 3/18; H02H 3/202; H02H 3/207; H02H 3/243; H02H 3/06; H02H 7/20; H02H 1/06; H02H 3/02
See application file for complete search history.

(56) References Cited

U.S. PATENT DOCUMENTS

| | | | |
|---|---|---|---|
| 9,196,209 B2 | 11/2015 | Yen | |
| 2006/0227080 A1 | 10/2006 | Huang et al. | |
| 2009/0212642 A1 | 8/2009 | Krah | |
| 2013/0021066 A1 | 1/2013 | Chen | |
| 2018/0358896 A1* | 12/2018 | Puggelli | ................ H02M 3/158 |
| 2019/0056457 A1* | 2/2019 | Li | ........................ G01R 31/396 |

* cited by examiner

*Primary Examiner* — Monica C King
(74) *Attorney, Agent, or Firm* — Saile Ackerman LLC; Stephen B. Ackerman

(57) ABSTRACT

A method and an apparatus for charge recycling. The method is comprised of the steps of receiving a charge at an energy storage element from a parasitic component, storing the charge at the energy storage element, and providing the charge stored at the energy storage element to a power supply's input or output. The step of receiving the charge at the energy storage element includes operating a discharging switch to selectively couple the parasitic component with the energy storage element and receiving the charge at the energy storage element via the discharging switch when the energy storage element and the parasitic component are coupled.

18 Claims, 11 Drawing Sheets

METHOD AND APPARATUS FOR CHARGE RECYCLING

TECHNICAL FIELD

The present disclosure relates to methods and apparatus for charge recycling. In particular, the present disclosure relates to a charge recycling circuit for discharging a parasitic component and providing the charge to a power supply. In particular, the present disclosure may be applied in LED backlighting applications.

BACKGROUND

FIG. 1 shows a known light emitting diode (LED) system 100 suitable for LED backlighting applications. The LED system 100 comprises an LED matrix 102, where the LED matrix 102 comprises a plurality of LED strings 104, 106, 108, 110, where each LED string 104, 106, 108, 110 comprises a plurality of LEDs 111.

Each LED string 104, 106, 108, 110 is coupled to an associated bit line 112, 114, 116, 118. An LED driver (120+122+124) is coupled to the LED strings 104, 106, 108, 110, and is configured to regulate a current through each of the LED strings 104, 106, 108, 110. The LED driver (120+122+124) comprises a transistor 120, an operational amplifier 122 and a resistor 124. The operational amplifier 122 receives a reference voltage vref at a first input and has a second input coupled to a terminal of the transistor 120. The operational amplifier 122 receives a supply voltage VDD.

Four bit lines 112, 114, 116, 118 and four LED strings 104, 106, 108, 110 are shown in FIG. 1. However, it will be appreciated that an LED system 100 may comprise more or less bit lines and more or less LED strings. Additionally, each LED string may comprise more or less LEDs.

The LED system 100 comprises a switch 126 for coupling an LED voltage (VLED) to an LED string 104, 106, 108, 110 via the associated bit line 112, 114, 116, 118. When the LED voltage is coupled to one of the LED strings 104, 106, 108, 110 a current will flow through the coupled LED string and the LED string will be illuminated. The switch 126 may, for example, be controlled by a computer that selects the required LED string 104, 106, 108, 110 to be illuminated when it is necessary for a given application. The switch 126 may be referred to as a bit line switch.

Each bit line 112, 114, 116, 118 is coupled to ground via a parasitic capacitor 128, 130, 132, 134. It will be appreciated that the capacitor circuit symbols denoting the parasitic capacitors 128, 130, 132, 134 do not represent physically implemented components but are provided to indicate the effect of parasitic capacitances on the bit lines 112, 114, 116, 118.

Each of the parasitic capacitors 128, 130, 132, 134 is capable of storing a charge. For example, if the switch 126 initially couples the LED voltage VLED to the bit line 112; then the switch 126 switches to couple the LED voltage VLED to the bit line 114. Charge will then be stored on the parasitic capacitor 128 such that the bit line 112 will be held at the LED voltage VLED.

The parasitic capacitor 128 may discharge to ground via the LED string 104 which can result in illumination of the LED string 104 despite being in an off state. This may be referred to as ghost lighting.

The LED system 100 comprises switches 131, 133, 135, 137, where each bit line 112, 114, 116, 118 has an associated switch 131, 133, 135, 137 and is coupled to ground when its associated switch 131, 133, 135, 137 is in a closed state. The inclusion of the switches 131, 133, 135, 137 enables charge stored on the parasitic capacitors 128, 130, 132, 134 to be discharged directly to ground, rather than via an LED string 104, 106, 108, 110.

For example, if the switch 126 initially couples the LED voltage VLED to the bit line 112; then the switch 126 switches to couple the LED voltage VLED to the bit line 114. Charge will be stored on the parasitic capacitor 128 such that the bit line 112 will be held at the LED voltage VLED. Switching the switch 131 to the closed state will then enable the parasitic capacitor 128 to be discharged to ground, thereby preventing ghost lighting of the LED string 104.

The LED system 100 may be used in portable electronics, such as cell phones and tablet computers that are powered by a lithium battery. In such portable electronics application there are strict power efficiency requirements and therefore it is undesirable to "waste" charge stored in a parasitic capacitor by discharging the charge to ground.

FIG. 2 shows a further known LED system 200 (the LED strings have been omitted in FIG. 2) that implements a bit line to bit line charge recycling scheme. The LED system 200 shares features with the LED system 100 and therefore common features share common reference numerals. Rather than including switches 131, 133, 135, 137 that enable coupling of the bit lines 112, 114, 116, 118 to ground, as is the case for the LED system 100 of FIG. 1, the LED system 200 comprises switches 202, 204, 206, 208, 210, 212 that are arranged to enable coupling of each bit line 112, 114, 116, 118 to any of the other bit lines 112, 114, 116, 118. For example, the bit line 112 may be coupled to the bit line 114 via the switch 202; coupled to the bit line 116 via the switch 204; or coupled to the bit line 118 via the switch 206. The LED system 200 enables charge stored in one of the parasitic capacitors 128, 130, 132, 134 to be recycled into another bit line rather than being discharged to ground.

The LED system 200 requires six switches 202, 204, 206, 208, 210, 212 to enable coupling of one bit line 112, 114, 116, 118 to any of the other bit lines 112, 114, 116, 118. A system having more bit lines would require more switches to enable the charge recycling function. The total switch number $N_{SW}$ for such a system may be calculated as follows, using equation (1):

$$N_{SW} = N_{BL} \times \frac{N_{BL}+1}{2} \quad (1)$$

where $N_{BL}$ is the number of bit lines.

Therefore, a large number of switches would be required to implement such a charge recycling scheme. This would require an unreasonably large die size and also would be prohibitively expensive.

Existing charge recycling schemes are described in the following documents: US 2009/0212642; US 2013/0021066; US 2006/0227080; U.S. Pat. No. 9,196,209, but they do not disclose providing the charge stored at the energy storage element to a power supply.

SUMMARY

It is desirable to provide a charge recycling scheme that overcomes or mitigates one or more of the above-mentioned problems.

According to a first aspect of the disclosure there is provided a method of charge recycling comprising receiving a charge at an energy storage element from a parasitic component, storing the charge at the energy storage element, and providing the charge stored at the energy storage element to a power supply.

Optionally, the charge stored at the energy storage element is provided to an input or an output of the power supply.

Optionally, the power supply is an internal power supply.

Optionally, the energy storage element is an internal energy storage element.

Optionally, receiving the charge at the energy storage element comprises operating a discharging switch to selectively couple the parasitic component with the energy storage element, and receiving the charge at the energy storage element via the discharging switch when the energy storage element and the parasitic component are coupled.

Optionally, receiving the charge at the energy storage element comprises receiving the charge from a plurality of parasitic components, the plurality of parasitic components comprising at least a first parasitic component and a second parasitic component, wherein the first parasitic component is suitable for storing a first charge, and the second parasitic component is suitable for storing a second charge.

Optionally, receiving the charge at the energy storage element comprises operating a first discharging switch to selectively couple the first parasitic component with the energy storage element, receiving the first charge at the energy storage element via the first discharging switch when the energy storage element and the first parasitic component are coupled, operating a second discharging switch to selectively couple the second parasitic component with the energy storage element, and receiving the second charge at the energy storage element via the second discharging switch when the energy storage element and the second parasitic component are coupled.

Optionally, the energy storage element comprises a capacitor.

Optionally, the power supply is configured to generate a supply voltage, and the energy storage element is coupled to the power supply.

Optionally, the power supply comprises a power converter.

Optionally, the power converter is a buck converter or a low dropout regulator.

Optionally, the method comprises at least partially generating the supply voltage using the charge received by the power supply.

Optionally, the method comprises providing a current to a load using the charge provided to the power supply.

According to a second aspect of the disclosure there is provided an apparatus comprising a charge recycling circuit comprising an energy storage element configured to receive a charge from a parasitic component, store the charge and to provide the charge to a power supply.

Optionally, the charge is provided to an input or an output of the power supply.

Optionally, the power supply is an internal power supply.

Optionally, the energy storage element is an internal energy storage element.

Optionally, the charge recycling circuit comprises a discharging switch configured to selectively couple the parasitic component with the energy storage element, wherein the charge is received from the parasitic component at the energy storage element via the discharging switch when the energy storage element and the parasitic component are coupled.

Optionally, the charge recycling circuit comprises a first discharging switch configured to selectively couple a first parasitic component with the energy storage element, and a second discharging switch configured to selectively couple a second parasitic component with the energy storage element, wherein a first charge is received from the first parasitic component at the energy storage element via the first discharging switch when the energy storage element and the first parasitic component are coupled, and a second charge is received from the second parasitic component at the energy storage element via the second discharging switch when the energy storage element and the second parasitic component are coupled.

Optionally, the energy storage element comprises a capacitor.

Optionally, the power supply is configured to generate a supply voltage, and the energy storage element is coupled to the power supply.

Optionally, the power supply comprises a power converter.

Optionally, the power converter is a buck converter or a low dropout regulator.

Optionally, the supply voltage is, at least partially, generated using the charge received by the power supply.

Optionally, the charge provided to the power supply is used to provide a current to a load.

Optionally, the apparatus comprises a bit line switched system, comprising a plurality of bit lines, wherein each bit line comprises a parasitic component suitable for storing the charge.

Optionally, the charge recycling circuit comprises a plurality of discharging switches, each discharging switch having an associated bit line, each discharging switch being configured to selectively couple the parasitic component of its associated bit line with the energy storage element, and for each parasitic component and discharging switch, the charge is received from the parasitic component at the energy storage element via the discharging switch when the energy storage element and parasitic component are coupled.

Optionally, each bit line is coupled to a light emitting diode.

Optionally, the apparatus comprises a bit line switch for selectively coupling at least one of the bit lines to an LED voltage.

BRIEF DESCRIPTION OF THE DRAWINGS

The disclosure is described in further detail below by way of example and with reference to the accompanying drawings, in which.

DETAILED DESCRIPTION

Figure 1:
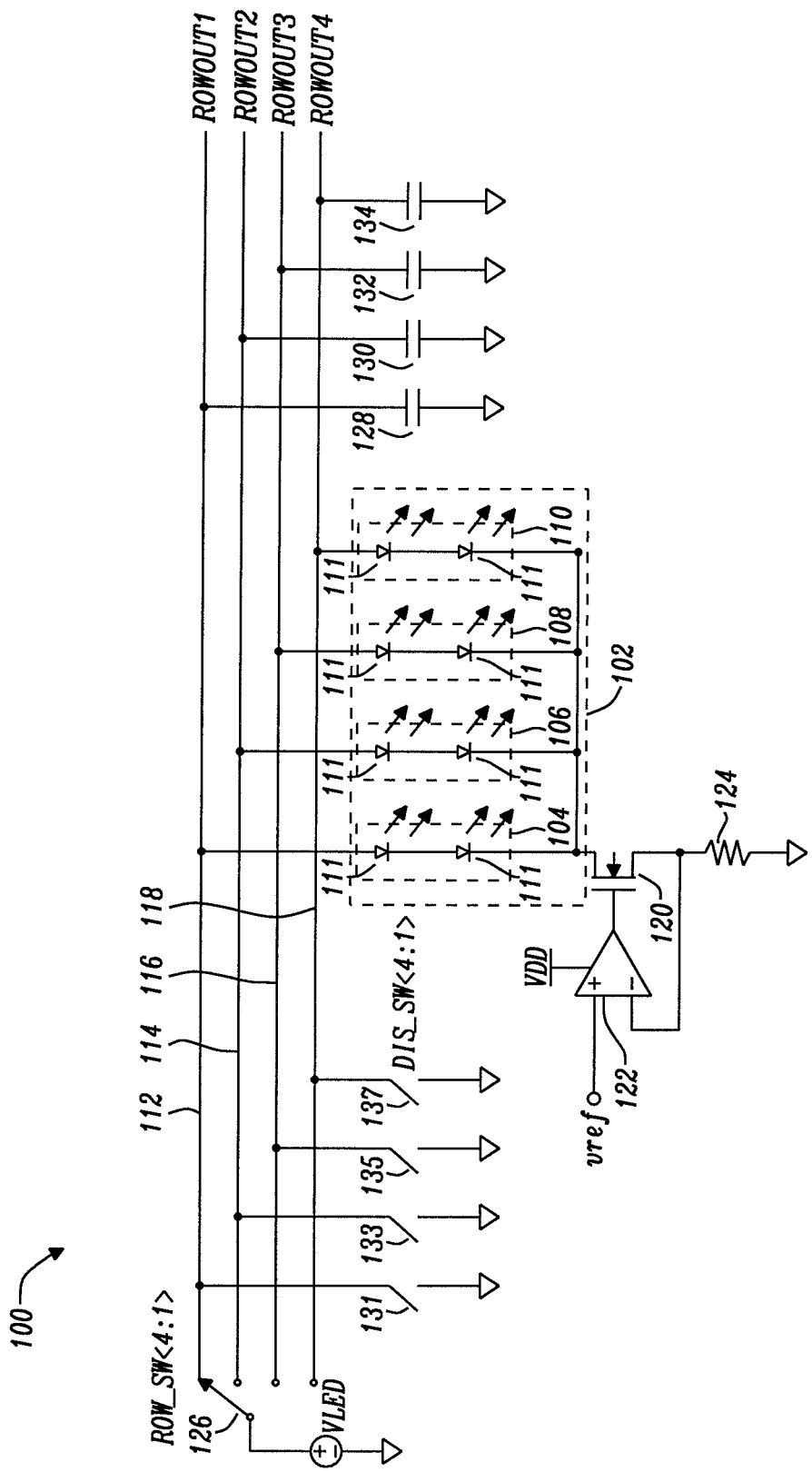
FIG. 1 is a schematic of a first known light emitting diode (LED) system for LED backlighting applications.
Figure 2:
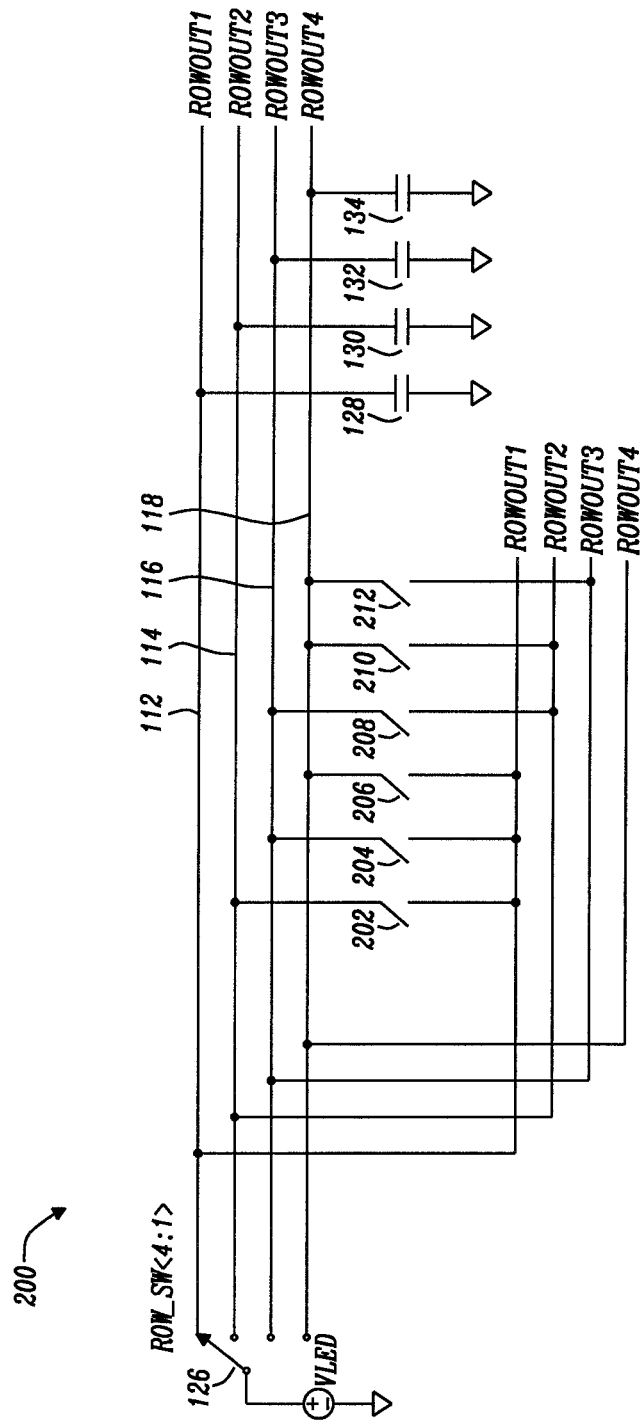
FIG. 2 is a schematic of a second known LED system for LED backlighting applications that implements a bit line to bit line charge recycling scheme.
Figure 3:
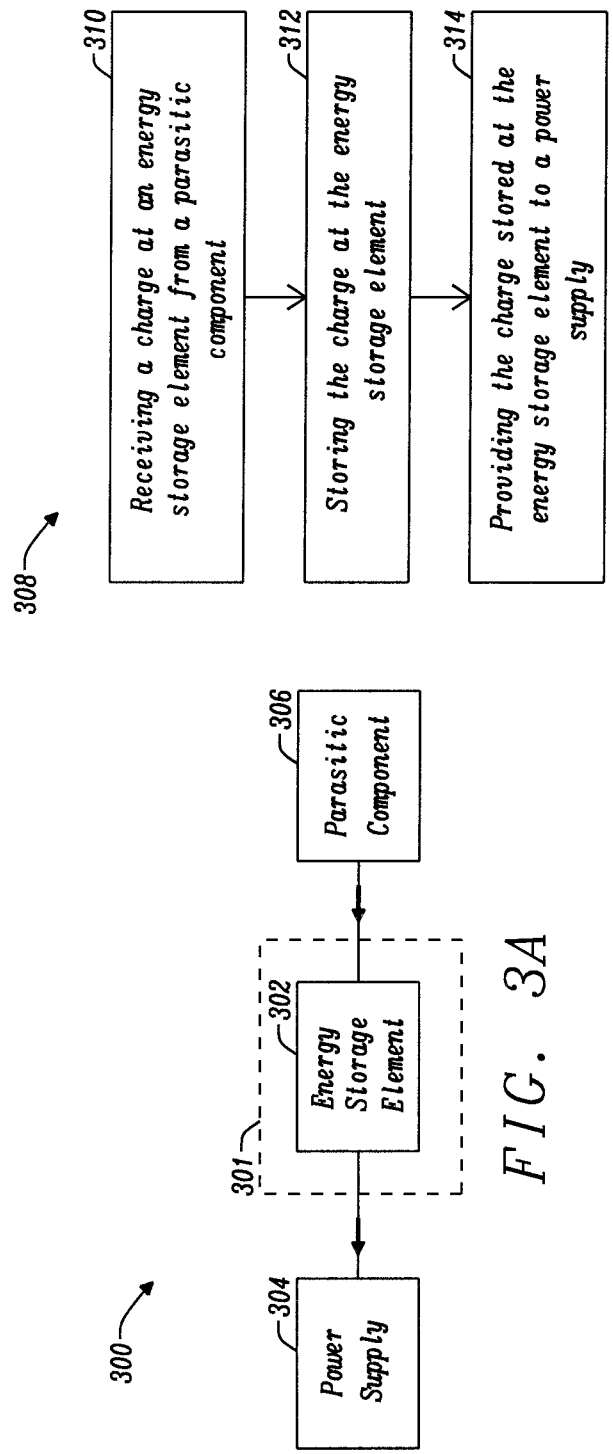
FIG. 3A is a schematic of an apparatus comprising a charge recycling circuit and 3B a flow chart of a method of charge recycling in accordance with a first embodiment of this disclosure.

FIG. 3A is a schematic of an apparatus 300 comprising a charge recycling circuit 301 in accordance with a first embodiment of this disclosure. The charge recycling circuit 301 comprises an energy storage element 302 configured to receive a charge, store the charge and to provide the charge to a power supply 304. The energy storage element 302 receives charge from a parasitic component 306, for example a parasitic capacitor. Parasitic components 306 are suitable for storing charge. The charge may be provided to an input or an output of the power supply 304.

FIG. 3B shows a method 308 of charge recycling in accordance with the first embodiment of this disclosure. The method 308 may be performed using the charge recycling circuit 301. The method comprises a first step 310 of receiving a charge at an energy storage element from a parasitic component; a second step 312 of storing the charge at the energy storage element; and a third step 314 of providing the charge stored at the energy storage element to a power supply. The charge may be provided to an input or an output of the power supply.

The power supply 304 may be an internal power supply, which may be referred to as a system power supply. The energy storage element 302 may be an internal energy storage element. The energy storage element 302 may comprise a capacitor. The power supply 304 may be configured to generate a supply voltage. The energy storage element 302 may be coupled to the power supply 304.

By "internal" it is meant that the power supply 304 or the energy storage element 302 is implemented on the same chip or within the same system as the source of the charge to be recycled (such as the parasitic component 306).

By providing the charge to the power supply 304, the charge may be recycled and used to provide power to other circuit elements within a chip implementing the apparatus 300.

A system implementing the apparatus 300 or using the method 308 can exhibit improved power efficiency by discharging electrical charge on a parasitic component 306, such as a high voltage parasitic capacitor, into an energy storage element 302, such as an energy storage capacitor or low voltage power supply capacitor, instead of discharging the charge to ground or other bit lines as is the case in the prior art.

The energy storage element 302 may be used to store, then reuse the residual electrical charge provided from the parasitic component 306, thereby increasing power efficiency.

A system implementing the apparatus 300 or using the method 308 and implementing an internal power supply for receiving the recycled charge will have a reduced bill of material (BOM) cost and a reduced the number of external components when compared with a system having an external power supply.

Figure 4:
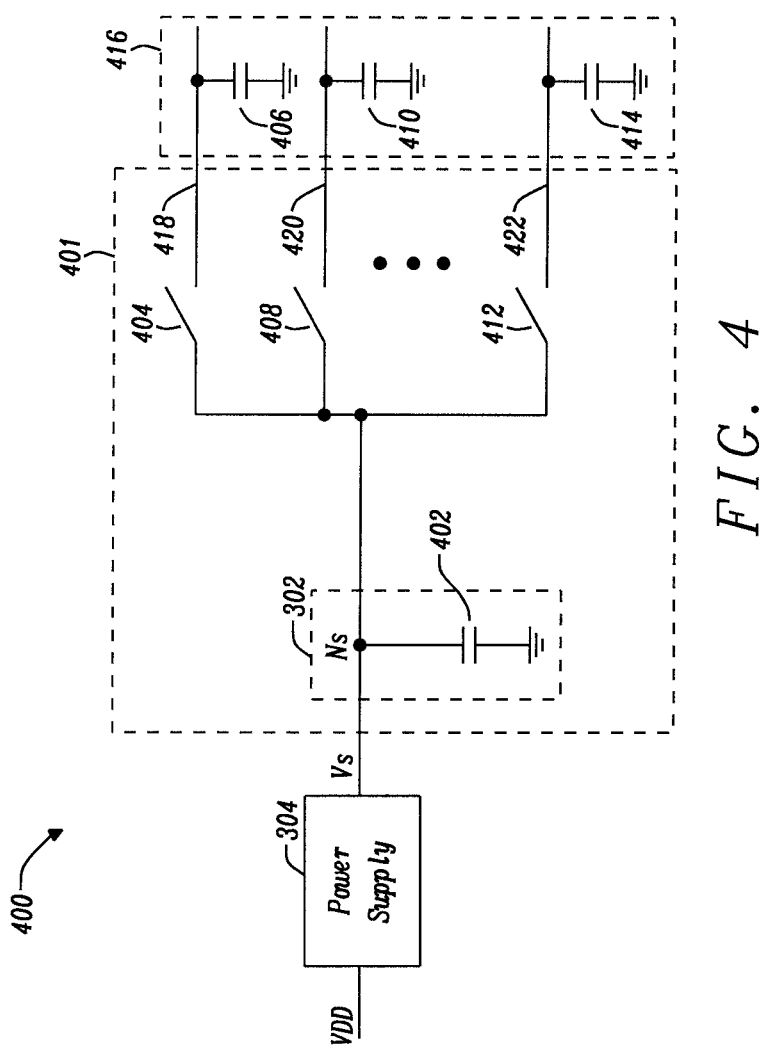
FIG. 4 is a schematic of an apparatus comprising a charge recycling circuit in accordance with a second embodiment of this disclosure.

FIG. 4 is a schematic of an apparatus 400 comprising a charge recycling circuit 401 in accordance with a second embodiment of this disclosure. The apparatus 400 shares features with the apparatus 300 and therefore common features are given common reference numerals.

The power supply 304 is coupled to the energy storage element 302. The energy storage element 302 comprises a capacitor 402 with a first terminal coupled to the power supply 304 via a storage node Ns, and a second terminal coupled to ground. The storage node Ns is at a stored voltage Vs which is provided to the power supply 304. The power supply 304 provides a supply voltage VDD at its output.

The capacitor 402 may be referred to as an energy storage capacitor.

The charge recycling circuit 401 comprises a discharging switch 404 that is configured to selectively couple a parasitic component 406 with the energy storage element 302. A first charge is received from the parasitic component 406 at the energy storage element 302 via the discharging switch 404 when the energy storage element 302 and the parasitic component 406 are coupled. The energy storage element 302 and the parasitic component 406 are coupled when the discharging switch 404 is in a closed state, and are decoupled when the discharging switch 404 is in an open state.

"Selectively coupling" is in reference to the coupling and/or decoupling of components, as controlled by a control signal received by a switch.

The charge recycling circuit 401 further comprises a discharging switch 408 that is configured to selectively couple a parasitic component 410 with the energy storage element 302. A second charge is received from the parasitic component 410 at the energy storage element 302 via the discharging switch 408 when the energy storage element 302 and the parasitic component 410 are coupled. The energy storage element 302 and the parasitic component 410 are coupled when the discharging switch 408 is in a closed state, and are decoupled when the discharging switch 406 is in an open state.

The charge recycling circuit 401 may further comprise additional discharging switches that are configured to selectively couple parasitic components with the energy storage element 302. For example, where n is any integer, there may be n discharging switches and n parasitic components, where there is an nth discharging switch 412 and an nth parasitic component 414.

Each of the parasitic components 406, 410, 414 are parasitic capacitors in this specific embodiment and each parasitic component 406, 410, 414 is associated with a different bit line.

The apparatus 400 comprises a bit line switched system 416, comprising a plurality of bit lines 418, 420, 422. Each bit line 418, 420, 422 comprises a parasitic component suitable for storing the charge. Each of the bit lines 418, 420, 422 is coupled to its associated discharging switch 404, 408, 412.

The bit line 418 comprises the parasitic component 406 and is coupled to the discharging switch 404. The bit line 420 comprises the parasitic component 410 and is coupled to the discharging switch 408. The bit line 422, is the nth bit line, and comprises the nth parasitic component 414 and is coupled to the nth discharging switch 412.

Each discharging switch 404, 408, 412 is configured to selectively couple the parasitic component 406, 410, 414 of its associated bit line with the energy storage element 302. For each parasitic component 406, 410, 414 and discharging switch 404, 408, 412, the charge is received from the parasitic component 406, 410, 414 at the energy storage element 302 via the discharging switch 404, 408, 412 when the energy storage element 302 and parasitic component 406, 410, 414 are coupled.

The apparatus 400 reduces the number of switches required when compared to a system implementing a bit line to bit line charge recycling scheme, thereby reducing device cost and die size.

There may be any number of discharging switches and bit lines for a given application in accordance with the understanding of the skilled person. For example, the present example of the apparatus 400 shows n discharging switches and n bit lines, where n is an integer. As such, n may be equal to any whole number greater than or equal to one.

In a further embodiment, the number of discharging switches and bit lines may be unequal. For example, there may be three bit lines and two discharging switches, such that one of the bit lines does not have an associated discharging switch to enable discharging of one of the parasitic capacitors. Also, in an alternative embodiment, there may be implemented the charge recycling circuit 401 having the discharging of parasitic components to an energy storage element, alongside other discharging methods as described previously. For example, some bit lines may discharge their parasitic capacitors to an energy storage element, whilst others may discharge to ground and/or other bit lines.

The power supply 304 is configured to generate the supply voltage VDD. In the apparatus 400, the energy storage element 302 is coupled to an input of the power supply 304. The supply voltage VDD is, at least partially, generated using the charge received by the power supply 304, and the supply voltage VDD is provided at an output of the power supply 304. The power supply 304 comprises a power converter, such as a DC-DC converter, for example a buck converter, a low dropout regulator LDO or a charge pump. The power converter may be any other type of power converter in accordance with the understanding of the skilled person.

Figure 5:
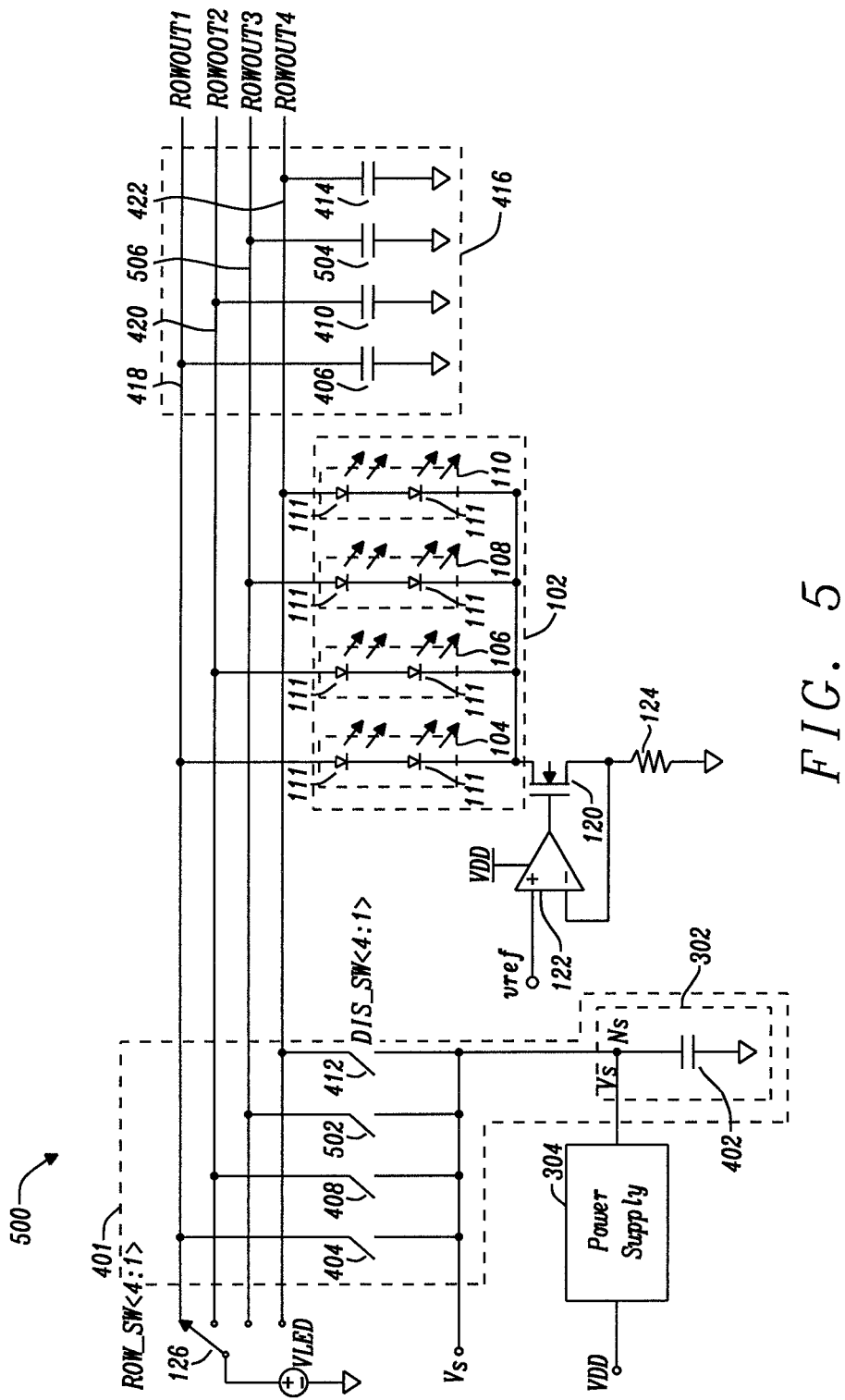
FIG. 5 is a schematic of an LED system in accordance with a third embodiment of this disclosure.

FIG. 5 is a schematic of an LED system 500 in accordance with a third embodiment of this disclosure. The LED system 500 may be, for example, a micro-LED backlighting system. The LED system 500 shares features with the LED system 100, the apparatus 300 and the apparatus 400 and therefore common features share common reference numerals. The LED system 500 comprises the apparatus 400 where n is equal to four, such that there are four bit lines 418, 420, 506, 422 and four associated discharging switches 404, 408, 502, 412. It will be appreciated that in FIG. 5 the bit lines 418, 420, 506, 422 are not restricted to the area enclosed by the box labelled 416.

Each bit line 404, 408, 502, 412 may be coupled to at least one LED. For example, in the LED system 500, each bit line 404, 408, 502, 412 is coupled to an LED string 104, 106, 108, 110 where each LED string 104, 106, 108, 110 comprises one or more LEDs 111.

The energy storage element 302 comprises a capacitor 402 for storing charge. The first terminal of the capacitor 402 is coupled to the power supply 304 via a storage node Ns. The storage node Ns is at a stored voltage Vs and is coupled to an input of the power supply 304. The stored voltage Vs is provided as an input to the power supply 304. The supply voltage VDD is, at least partially, generated using the stored voltage Vs.

Figure 6:
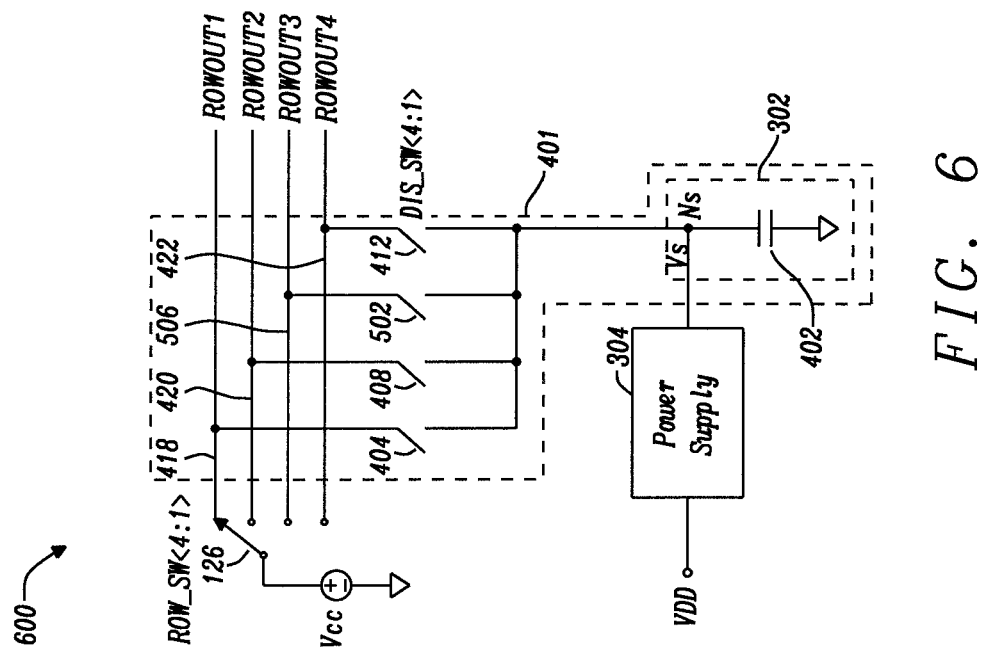
FIG. 6 is an apparatus in accordance with a fourth embodiment of this disclosure.

FIG. 6 shows an apparatus 600 in accordance with a fourth embodiment of this disclosure. The apparatus 600 comprises the charge recycling circuit 401, the power supply 304 and the switch 126 as described in FIG. 5 for the LED system 500. The apparatus 600 shows a general implementation and is not restricted to an LED display application. As such the LED voltage VLED of the apparatus 500 has been replaced by a voltage Vcc for coupling to each of the bit lines 418, 420, 506, 422 via the switch 126 when it is in a closed state. As such, it can be seen that the apparatus 600 may be used with any suitable circuit arrangement comprising any number of bit lines (including a single bit line), for discharging charge to a storage element 302 and providing the charge to a power supply 304, in accordance with the understanding of the skilled person. Additionally, any of the embodiments presented herein may be adapted for applications other than LED display applications, in accordance with the understanding of the skilled person. Such applications may include, but are not limited to bit line switched systems comprising memory elements rather than LEDs.

Figure 7:
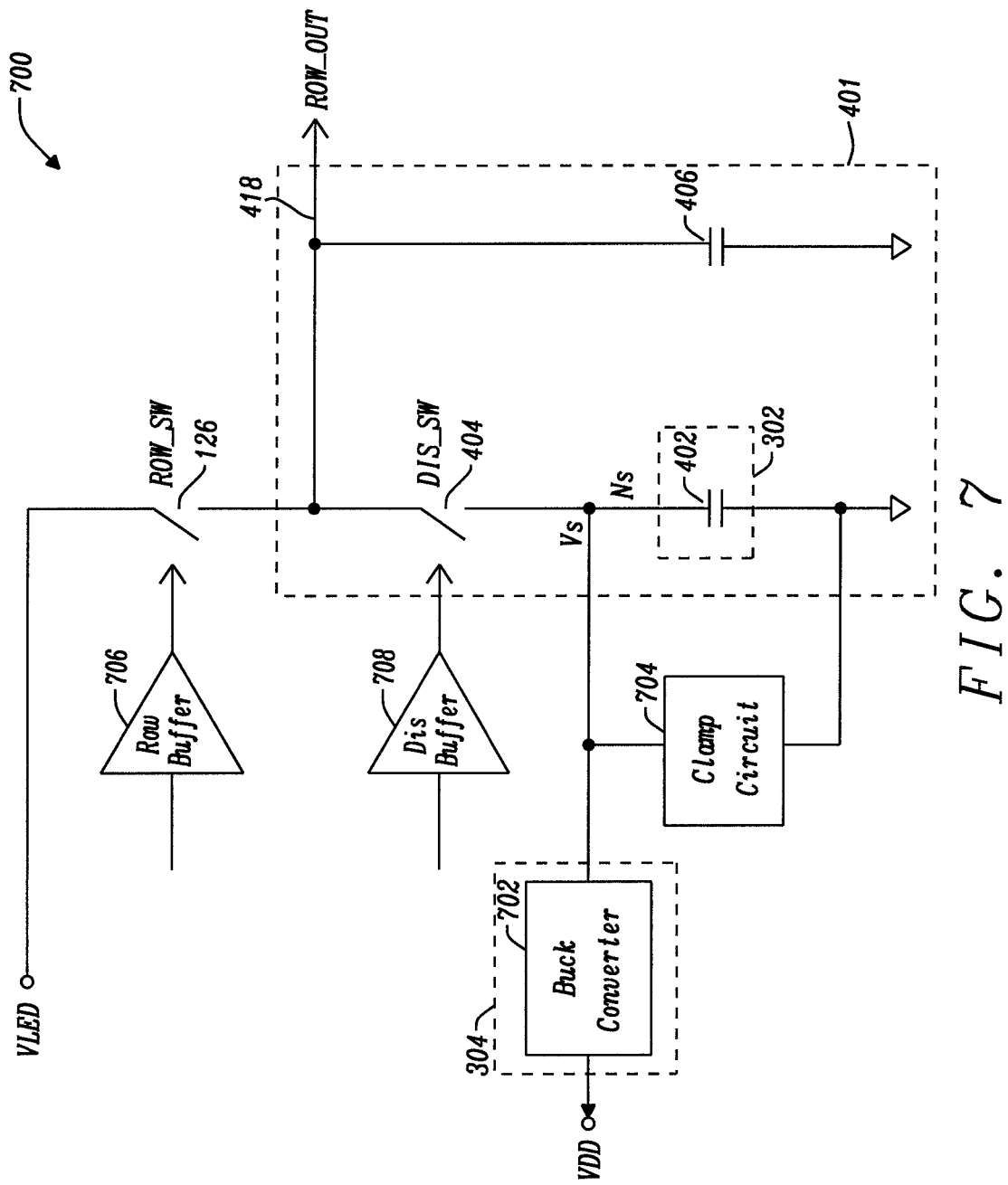
FIG. 7 is an apparatus in accordance with a fifth embodiment of this disclosure.

FIG. 7 shows an apparatus 700 in accordance with a fifth embodiment of this disclosure. The apparatus 700 comprises the charge recycling circuit 401, the power supply 304 and the switch 126 as described previously in FIG. 5 and FIG. 6. In this specific implementation there is provided a single bit line 418, a single parasitic capacitor 406 and a single discharge switch 404. It will be appreciated that the apparatus 700 may alternatively comprise more discharge switches and bit lines with parasitic capacitors in accordance with the understanding of the skilled person.

In the apparatus 700, the power supply 304 comprises a buck converter 702 which is a type of power converter. The storage node Ns is coupled to an input of the buck converter 702 and in operation, the stored voltage Vs is provided as an input to the buck converter 702. The apparatus 700 further comprises a clamp circuit 704, having a first terminal coupled to a first terminal of the capacitor 402 and a second terminal coupled to a second terminal of the capacitor 402.

The apparatus 700 comprises an LED channel on/off control (706+708) comprising controllers 706, 708. The switch 126 is configured to receive a first control signal from the controller 706 to switch the switch 126 from an open state to a closed state or from a closed state to an open state; and the discharge switch 404 is configured to receive a second control signal from the controller 708 to switch the discharge switch 404 from an open state to a closed state or from a closed state to an open state.

The stored voltage Vs is equal to a middle voltage VMID after the charge stored by the parasitic capacitor 406 has been discharged to the capacitor 402, and may be calculated as follows using equation (2):

$$(VLED-VMID) \times Cp = (VMID-Vs0) \times Cs \quad (2)$$

where Cp is the capacitance of the parasitic capacitor 406; Vs0 is an initial voltage at the storage node Ns, prior to discharging of the parasitic capacitor 406; and Cs is the capacitance of the capacitor 402. The other symbols have their meaning as previously described.

The initial voltage Vs0 may therefore be the lowest input voltage received by the buck converter 702. The middle voltage VMID may therefore be the highest input voltage received by the buck converter 702

For example, for VLED=20V; Cp=Cs=2.56 nF; and Vs0=5V; then the middle voltage VMID=12.5V.

An average discharge current Iavg1, which is the average current flowing from the parasitic capacitor 406 to the capacitor 402 as the parasitic capacitor 406 is being discharged is as shown in equation (3):

$$Iavg1=(VLED-VMID) \times Cp \times Fsw \qquad (3)$$

where Fsw is the frequency of switching of the switch 126 and the discharging switch 404 provided by the LED channel on/off control (706+708). The other symbols have their meaning as described previously.

For example, for VLED=20V; VMID=12.5V; Cp=2.56 nF; Fsw=20 kHz; then Iavg1=384 µA.

The total residual power PRSD consumed by the circuit during the discharging of the parasitic capacitor 406 to the capacitor 402 is as follows using equation (4):

$$PRSD=(VMID-Vs0) \times Iavg1 \qquad (4)$$

Using the values listed previously, the total residual power PRSD=2.88 mW.

Where the power supply 304 is a low voltage power supply, the buck converter 702 may be a step down buck DC-DC converter with an efficiency ratio η of 90% for the generation of the supply voltage VDD. A current IDD that may be provided by the power supply 304 may be calculated as follows using equation (5):

$$IDD = PRSD \times \frac{\eta}{VDD} \qquad (5)$$

Assuming a typical supply voltage VDD value where VDD=2.5V, the power supply 304 and the supply voltage VDD can provide a current IDD of 1 mA and therefore can support a load current of 1 mA.

A load is a circuit element or component that consumes power and as such the load can receive power when coupled to the power supply 304 with the supply voltage VDD. The load current is the current that is required by the load and the current IDD is the current that may be provided to the load by the power supply 304.

It may be possible for the average discharge current Iavg1 to exceed the current IDD of the power supply 304, thereby resulting in the stored voltage Vs being charged too high, such that will exceed the middle voltage VMID, as calculated above. In such circumstances the parasitic capacitor 406 will not be discharged fully. The clamp circuit 704 is provided to resolve this issue by providing an upper limit to the stored voltage Vs provided to the buck converter 702. The clamp circuit 704 may be, for example, a zener diode. The clamp circuit 704 may provide an over voltage protection (OVP) function.

Figure 8:
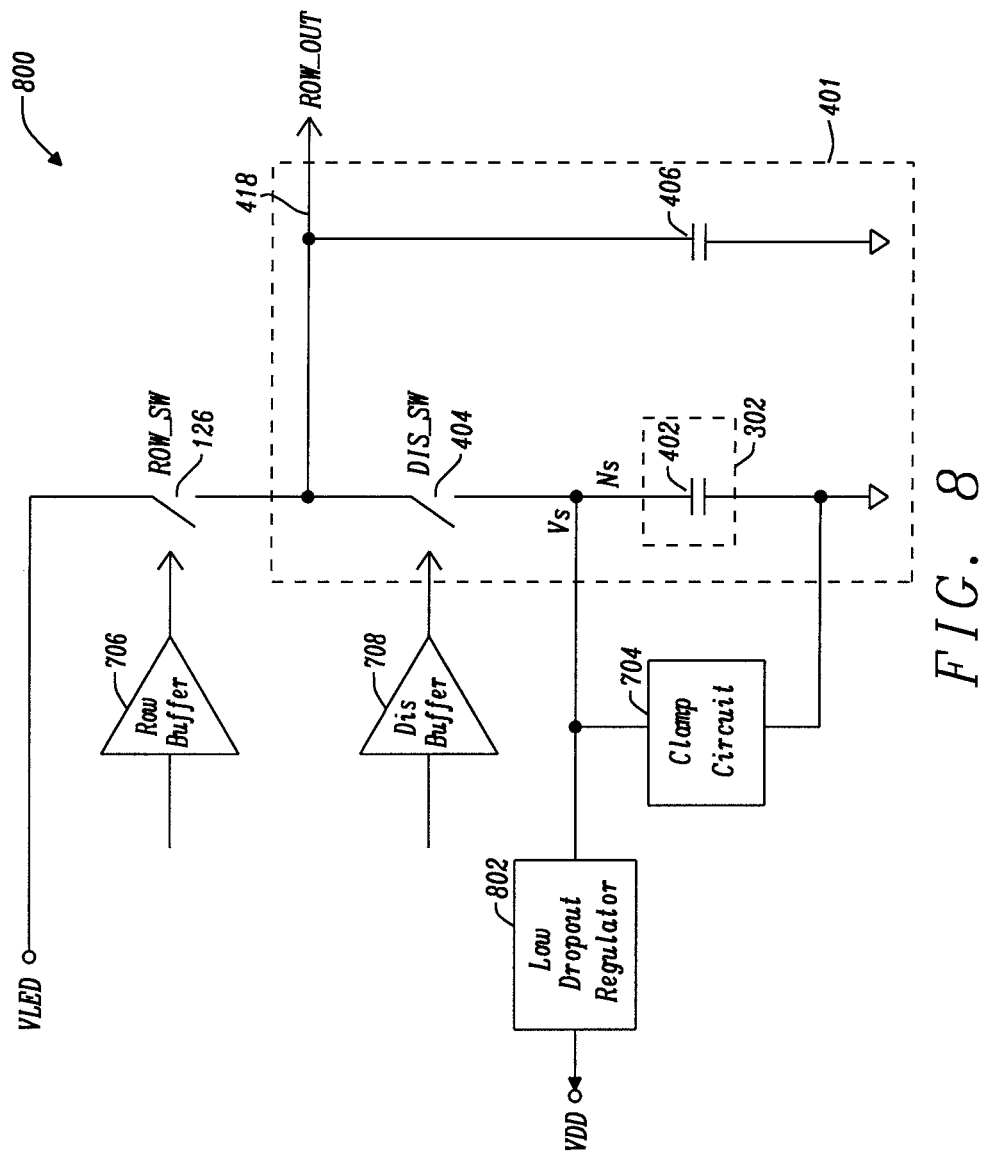
FIG. 8 is an apparatus in accordance with a sixth embodiment of this disclosure.

FIG. 8 shows an apparatus 800 in accordance with a sixth embodiment of this disclosure. The apparatus 800 is as described for the apparatus 700 of FIG. 7, but rather than implementing a buck converter as part of the power supply 304, the power supply 304 of the apparatus 800 comprises a low drop out regulator (LDO) 802, which is a type of power converter.

The LDO 802 will typically provide a lower efficiency ratio η than the buck converter 702. However, an LDO 802 provides the advantage of being able to support the average discharge current Iavg1 of 384 µA directly.

The LDO 802 can support the average discharge current Iavg1 "directly" if it implements only internal components. This is in contrast with a buck converter that may implement an external component, such as an inductor.

As discussed previously, by "internal" it is meant that the LDO 802 comprises components that are integrated on the same chip or within the same system, whereas "external" is in reference to components that are implemented outside the chip or outside the system. For example, the inductor of the buck converter may not be implemented on the same chip as the buck converter's switches.

It will be appreciated that the clamp circuit 704, the buck converter 702 and the LDO 802 are advantageous but non-essential features.

Figure 9:
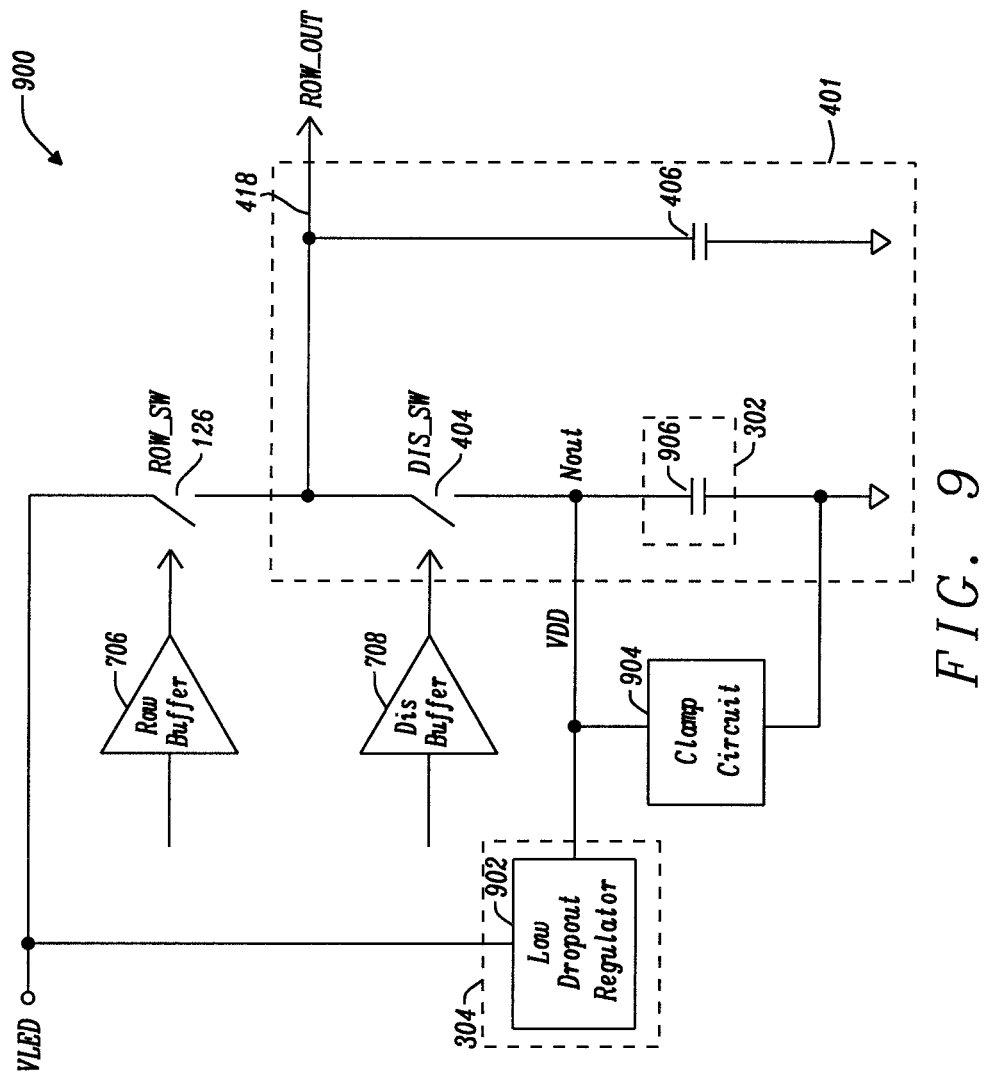
FIG. 9 is an apparatus in accordance with a seventh embodiment of this disclosure.

FIG. 9 shows an apparatus 900 in accordance with a seventh embodiment of this disclosure. Common features between FIG. 9 and the previous figures share common reference numerals.

The apparatus 900 comprises a clamp circuit 904 and a capacitor 906. The power supply 304 of the apparatus 900 comprises an LDO 902 which is a type of power converter. The LDO 902 has an input coupled to the LED voltage VLED. In a further embodiment the LDO 902 may have its input coupled to another voltage.

The LDO 902 has an output coupled to the discharge switch 404, the energy storage element 302 and a first terminal of the clamp circuit 904 at an output node Nout. The LDO 902 outputs the supply voltage VDD at the output node Nout. A second terminal of the clamp circuit 904 is coupled to ground. The clamp circuit 904 operates as described previously for the clamp circuit 704 of FIGS. 7 and 8.

The energy storage element 302 comprises a capacitor 906 with a first terminal coupled to the output node Nout and a second terminal coupled to ground. In the apparatus 900, the capacitor 906 may be a low voltage power supply capacitor. The charge from the parasitic capacitor 406 may be discharged to the capacitor 906 directly, and therefore the charge is provided directly to the supply voltage VDD. Therefore, charge stored at the energy storage element 302 is provided to the output of the power supply 304. The parasitic capacitor 406 may be a high voltage parasitic capacitor.

Voltage ripple refers to a periodic variation in a voltage. The apparatus 900 may be suitable for an application where the presence of a voltage ripple VRIP on the supply voltage VDD is not a substantial concern. The capacitor 906 may reduce the voltage ripple VRIP of the supply voltage VDD.

The voltage ripple VRIP may be calculated as follows using equation (6):

$$(VLED-VDD) \times CP=VRIP \times CL \qquad (6)$$

where CP is the capacitance of the parasitic capacitor 406 and CL is the capacitance of the capacitor 906.

For VLED=20V; VDD=2.7V; CP=2.56 nF; CL=1 uF; the voltage ripple VRIP will be equal to 44.288 mV (assuming an unchanging load current of 1 mA). The voltage ripple VRIP is approximately 1.64% of the supply voltage VDD, which represents a small variation in the supply voltage VDD. It will be appreciated that the calculation of the voltage ripple VRIP being equal to 44.288 mV assumes that there are no changes in the load current, which would result in variation of the supply voltage VDD. As such, the voltage ripple VRIP calculated here is a result of charge recycling and not due to any change in load current.

The average discharge current Iavg2 for the apparatus 900 may calculated as follows using equation (7):

$$Iavg2=(VLED-VDD) \times CP \times Fsw \qquad (7)$$

For a switching frequency FSW=20 kHz, the average discharge current Iavg2 will be equal to 885.76 µA. This means that the charge on the parasitic capacitor 406 can provide an average discharge current Iavg2 of about 885.76 µA during one switch period.

In the apparatus 900 the average discharge current Iavg2 is the current provided by the recycled charge. The average discharge current Iavg2 can contribute directly to the current provided to the load, thereby alleviating the requirements of the power supply 304 in providing current to the load. For example, for a load current of 1 mA, the power supply 304 can provide 114.24 μA and the average discharge current Iavg2 can provide 885.76 μA. Therefore, the charge provided to the power supply 304 is used to provide a current (the average discharge current Iavg2) to the load.

Figure 10:
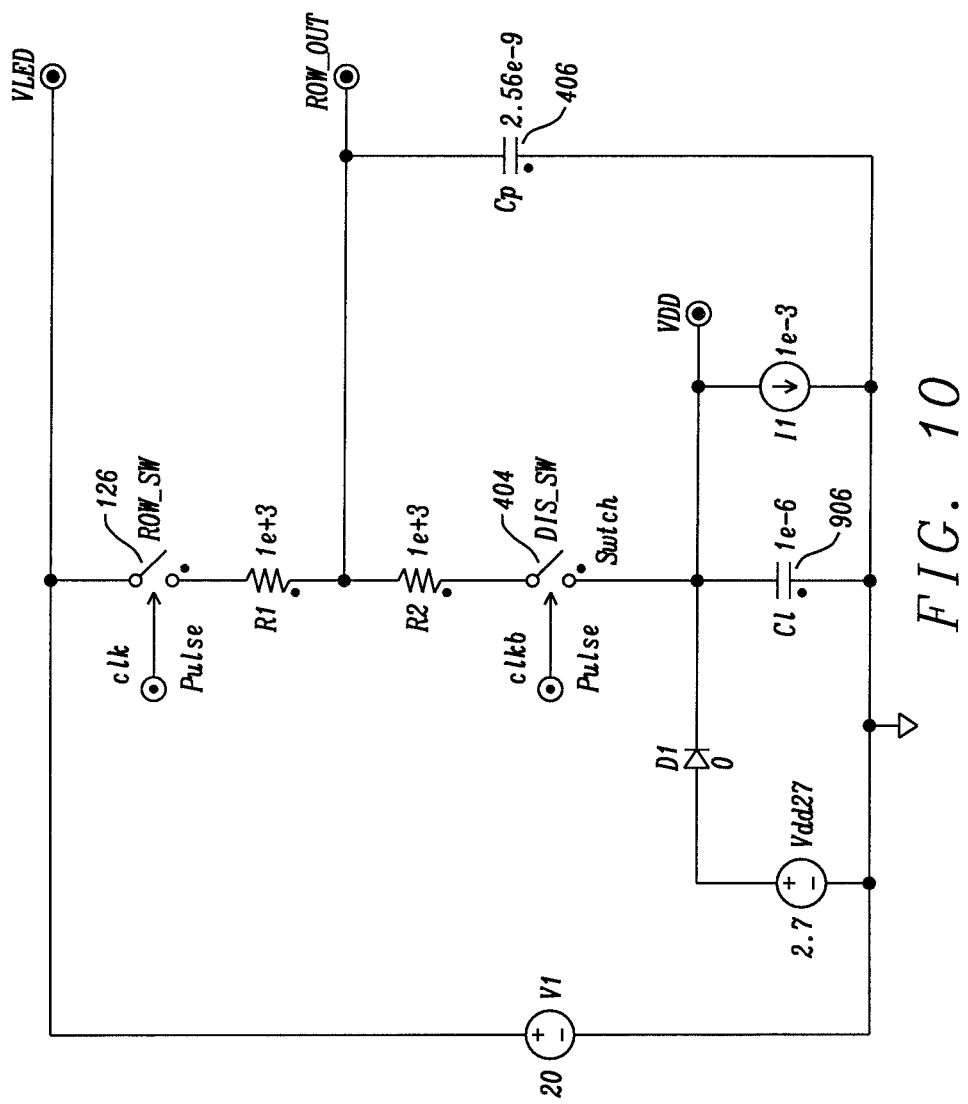
FIG. 10 is a simulation layout for the apparatus of FIG. 9.

FIG. 10 shows a simulation layout for the apparatus 900. R1 and R2 represent the on resistances of the switch 126 and the discharge switch 404, respectively. The simulation was performed using parameters that are typical of a practical implementation of the apparatus 900 and are as follows: VLED=20V; VDD=2.7V; CP=2.56 nF; CL=1 uF; FSW=20 KHz; and a load current ILOAD=1 mA.

Figure 11:
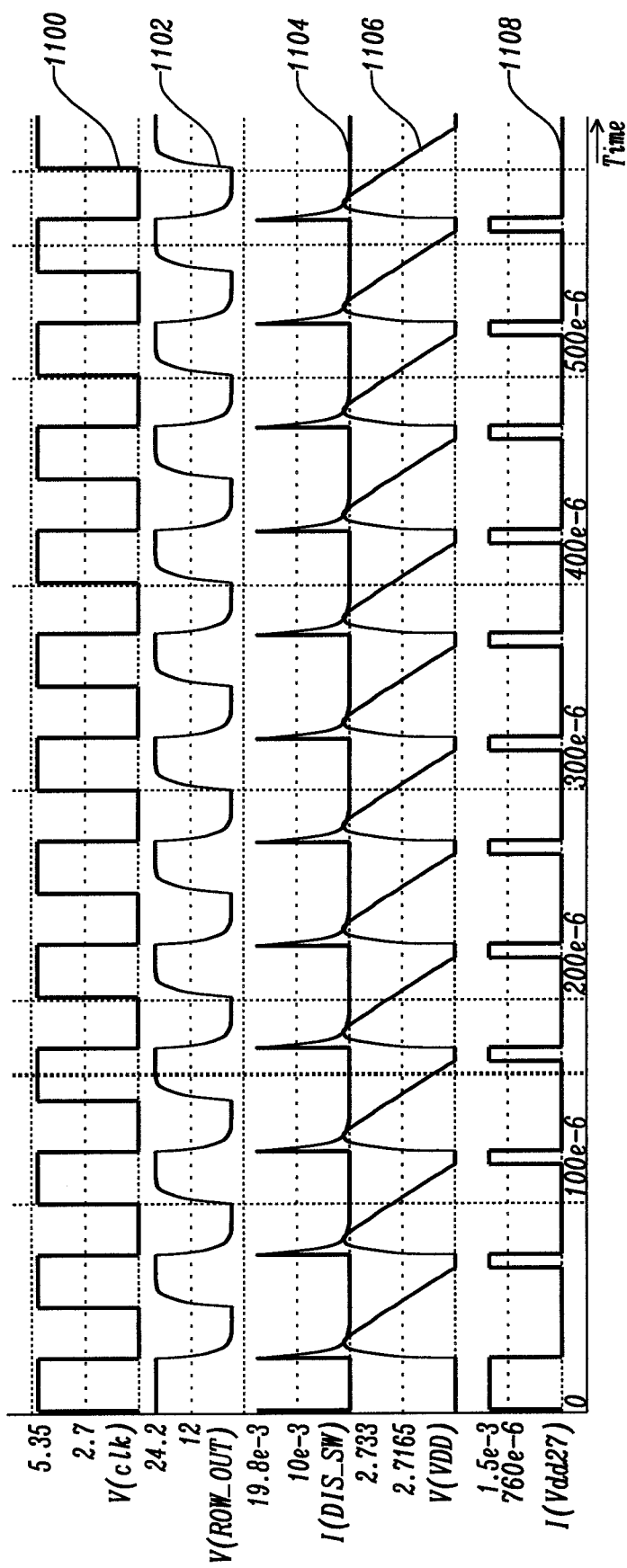
FIG. 11 shows simulated waveforms for the apparatus of FIG. 9 and the simulation layout of FIG. 10.

FIG. 11 shows simulated waveforms for the apparatus 900. The simulated waveforms shown in FIG. 11 are as follows: a clock signal 1100 (that controls a switching operation of the switch 126 and the discharge switch 404); a voltage 1102 of the bit line 418; a current 1104 that flows from the parasitic capacitor 406 to the capacitor 906; the supply voltage VDD 1106; and a current 1108 provided by the LDO 902.

It can be observed that the voltage ripple on the supply voltage VDD is 34 mV which is less than the value of 44.288 mV as calculated previously. This is a result of there always being a 1 mA load current on the supply voltage VDD during the simulation.

The power supply and supply voltage VDD provides about 115 μA to a 1 mA load current and the average discharge current Iavg2 provides about 885 μA.

Various improvements and modifications may be made to the above without departing from the scope of the disclosure.

What is claimed is:

1. A method of charge recycling comprising:
    coupling a first voltage to an electrical component via a bit line, such that a current flows through the electrical component;
    decoupling the first voltage from the electrical component, such that a residual electrical charge is stored on a parasitic component of the bit line;
    receiving the residual electrical charge at an energy storage element from the parasitic component;
    storing the residual electrical charge at the energy storage element; and
    providing the residual electrical charge stored at the energy storage element to an internal power supply, thereby recycling the residual electrical charge.

2. The method of claim 1, wherein the residual electrical charge stored at the energy storage element is provided to an input or an output of the internal power supply.

3. The method of claim 1, wherein the energy storage element is an internal energy storage element.

4. The method of claim 1, wherein receiving the residual electrical charge at the energy storage element comprises:
    operating a discharging switch to selectively couple the parasitic component with the energy storage element; and
    receiving the residual electrical charge at the energy storage element via the discharging switch when the energy storage element and the parasitic component are coupled.

5. The method of claim 1, wherein receiving the residual electrical charge at the energy storage element comprises:
    receiving the residual electrical charge from a plurality of parasitic components, the plurality of parasitic components comprising at least a first parasitic component and a second parasitic component; wherein:
    the first parasitic component is suitable for storing a first residual electrical charge, and the second parasitic component is suitable for storing a second residual electrical charge.

6. The method of claim 5, wherein receiving the residual electrical charge at the energy storage element comprises:
    operating a first discharging switch to selectively couple the first parasitic component with the energy storage element;
    receiving the first residual electrical charge at the energy storage element via the first discharging switch when the energy storage element and the first parasitic component are coupled;
    operating a second discharging switch to selectively couple the second parasitic component with the energy storage element; and
    receiving the second residual electrical charge at the energy storage element via the second discharging switch when the energy storage element and the second parasitic component are coupled.

7. The method of claim 1, wherein the energy storage element comprises a capacitor.

8. The method of claim 1, wherein:
    the internal power supply is configured to generate a supply voltage; and
    the energy storage element is coupled to the internal power supply.

9. The method of claim 1, wherein the internal power supply comprises a power converter.

10. The method of claim 9, wherein the power converter is a buck converter or a low dropout regulator.

11. The method of claim 8, comprising at least partially generating the supply voltage using the residual electrical charge received by the internal power supply.

12. The method of claim 1, comprising providing a current to a load using the residual electrical charge provided to the internal power supply.

13. An apparatus comprising:
    a charge recycling circuit comprising an energy storage element; wherein:
    an electrical component is configured to be:
        coupled to a first voltage via a bit line, such that a current flows through the electrical component; and
        decoupled from the first voltage, such that a residual electrical charge is stored on a parasitic component of the bit line; and
    the energy storage element is configured to;
        receive the residual electrical charge from the parasitic component;
        store the residual electrical charge; and
        to provide the residual electrical charge to an internal power supply, thereby recycling the residual electrical charge.

14. The apparatus of claim 13, wherein the residual electrical charge is provided to an input or an output of the internal power supply.

15. The apparatus of claim 13, comprising:
    a bit line switched system, comprising a plurality of bit lines, wherein each bit line comprises a parasitic component suitable for storing the residual electrical charge.

16. The apparatus of claim 15, wherein:
the charge recycling circuit comprises a plurality of discharging switches, each discharging switch having an associated bit line;
each discharging switch being configured to selectively couple the parasitic component of its associated bit line with the energy storage element; and
for each parasitic component and discharging switch, the residual electrical charge is received from the parasitic component at the energy storage element via the discharging switch when the energy storage element and parasitic component are coupled.

17. The apparatus of claim 15, wherein each bit line is coupled to an electrical component.

18. The apparatus of claim 17, comprising a bit line switch for selectively coupling at least one of the bit lines to the first voltage.

\* \* \* \* \*